United States Patent
Kumeth

(10) Patent No.: US 7,299,913 B2
(45) Date of Patent: Nov. 27, 2007

(54) DRIVE UNIT FOR A VIBRATING SPIRAL CONVEYOR

(75) Inventor: Sigmund Kumeth, Kastl (DE)

(73) Assignee: Feintool International Holding, Lyss (CH)

( * ) Notice: Subject to any disclaimer, the term of this patent is extended or adjusted under 35 U.S.C. 154(b) by 287 days.

(21) Appl. No.: 11/146,578

(22) Filed: Jun. 6, 2005

(65) Prior Publication Data
US 2006/0016667 A1    Jan. 26, 2006

(30) Foreign Application Priority Data
Jul. 15, 2004    (DE) ...................... 10 2004 034 481

(51) Int. Cl.
*B65G 27/02* (2006.01)
(52) U.S. Cl. ...................... 198/757; 198/756
(58) Field of Classification Search ............... 198/756, 198/757
See application file for complete search history.

(56) References Cited

U.S. PATENT DOCUMENTS

| | | | |
|---|---|---|---|
| 3,757,932 A * | 9/1973 | Baljet et al. ............... | 198/757 |
| 4,181,216 A * | 1/1980 | Cipu ........................... | 198/757 |
| 4,633,995 A * | 1/1987 | Hamada ..................... | 193/2 R |
| 4,658,953 A * | 4/1987 | Schopfer et al. ............ | 198/757 |
| 5,074,404 A * | 12/1991 | Gonda et al. ............... | 198/757 |
| 5,404,995 A * | 4/1995 | Graham ....................... | 198/757 |
| 5,611,423 A * | 3/1997 | Graham ....................... | 198/757 |
| 7,143,891 B2 * | 12/2006 | Kumeth ....................... | 198/757 |

FOREIGN PATENT DOCUMENTS

| AT | 360 906 | 2/1981 |
|---|---|---|
| DE | 72 29 314 | 8/1972 |
| DE | 36 00 334 | 7/1986 |
| DE | 41 38 956 | 3/1993 |
| EP | 59-158720 | 9/1984 |
| EP | 0 644 134 | 2/1992 |

* cited by examiner

*Primary Examiner*—Mark A. Deuble
(74) *Attorney, Agent, or Firm*—Jordan and Hamburg LLP

(57) ABSTRACT

Drive unit for a vibrating spiral conveyor, consisting of a base part, with which an opposed-action part and a fastening part, the motion of which is coupled with that of a pot, are connected flexibly, the former over several first leaf spring elements and the latter over several second leaf spring elements, it being possible to bring the opposed-action part and the fastening part into an opposite, oscillating, torsionally vibrating movement about a central axis of rotation, characterized in that the leaf spring elements (10, 11) are disposed in such a manner that their central transverse axis (M), which is perpendicular to the longitudinal axis, intersects a leaf spring element (10, 11) essentially in the center with respect to its length and extends parallel to the lateral surfaces of the spring, is disposed essentially radially to the axis of rotation (D).

12 Claims, 2 Drawing Sheets

DRIVE UNIT FOR A VIBRATING SPIRAL CONVEYOR

BACKGROUND OF THE INVENTION

The invention relates to a drive unit for a vibrating spiral conveyor, consisting of a base part, with which an opposed-action part and a fastening part, the motion of which is coupled with that of a pot, are connected flexibly, the former over several first leaf spring elements and the latter over several second leaf spring elements, it being possible to bring the opposed-action part and the fastening part into an opposite, torsionally vibrating movement about a central axis of rotation.

Vibrating, spiral conveyors serve to convey and, optionally, orient small components, which are brought, as a disordered quantity, into the conveyor pot. At the inner surface of the conveyor pot, a peripheral conveyor helix is provided, along which the smallest components are moved forwards by micro-throws during the operation, during which the pot vibrates at a high frequency. A vibrating spiral conveyor with a drive unit of the type in question here is known, for example, from EP 0 644 134 B1. The drive unit, described there, has a base part, over which it and, with it, the vibrating spiral conveyor are fastened to a machine table or a machine frame, rubber buffers being interposed. During operation, parts, vibrating opposite to one another, are connected over appropriate leaf spring elements with the base part, namely, on the one hand, an opposed-action part, which is connected flexibly with the base part over several first leaf spring elements, and, on the other, a fastening part, which is coupled flexibly over several second leaf spring elements with the base part. The opposite movements of the parts is brought about by a drive device, acting between them, as a rule, an electromagnetic drive device with a magnetic core, which is fastened especially at the opposed-action part, and a magnet armature, which is disposed at the fastening part.

The possibility of moving both parts relative to one another and relative to the base is ensured, as described, over the respective leaf spring elements. For drive units of the type in question, the leaf spring elements are disposed distributed about the central axis of rotation. Admittedly, by this construction, appreciable damping of interfering vibrations, introduced into the base part and passed on by the latter to the machine frame, can be achieved because of the equalization of vibrational forces due to the oppositely vibrating masses. However, during prolonged operation and, with that, fatigue loading of the leaf spring elements, damage to the leaf spring elements up to breakage of the springs has resulted from the stress on the springs. Frequently, in spite of the similar construction of the drive units and of the assembled vibrating spiral conveyors, a uniform vibrating behavior could not be observed. This means that there is a relative large scatter in the vibrating behavior of the individual units. Finally, the conveying speeds of vibrating spiral conveyors of similar construction were frequently also different.

The invention is therefore based on the problem of indicating a drive unit, which is an improvement by comparison and permits a reliable and homogeneous vibrating behavior.

SUMMARY OF THE INVENTION

Pursuant to the invention, the leaf spring elements are disposed in such a manner in a drive unit of inventive type that its central transverse axis, which is perpendicular to the longitudinal axis, intersects a leaf spring element essentially in the center with respect to its length and extends parallel to the lateral surfaces of the spring, is essentially radial to the axis of rotation.

The inventive drive unit is distinguished by a particular alignment of the leaf spring elements with respect to the axis of rotation. These are now disposed quasi star-shaped in such a manner, that their central transverse axis, which intersects a leaf spring element centrally with respect to its length and extends parallel to the side surfaces, extends radially to the axis of rotation or intersects the latter. This special arrangement of the spring elements leads to significantly less bending and to a significantly lower torsion of the individual leaf spring elements during the oscillating torsional vibration of the parts, coupled to it, about the central axis of rotation, than is the case for drive units of the state of the art, because for the latter, the spring elements are disposed asymmetrically with respect to the axis of rotation. This means that the central transverse axes of the leaf spring elements do not extend radially there to the axis of rotation and, instead, are offset thereto. As a result of this offset, the leaf spring element experiences a high a bending and torsional load during the oscillating, torsional vibration. If the leaf spring elements are now aligned pursuant to the invention with respect to the axis of rotation, the bending and torsional loads can, as described, be reduced distinctly. A relatively defined spring behavior can also be set, since the total stress on the spring is less complex than in the case of asymmetrically disposed leaf spring elements. Finally, different similarly constructed drive units or vibrating spiral conveyors show hardly any differences in vibrational behavior, and with that, in conveying speed. This means that the tolerance width for equipment of similar construction can be reduced. Furthermore, due to the inventive arrangement of the springs, a significant increase in the service life of the leaf spring elements and, resulting therefrom, an improvement in the operational reliability as well as an increase in the operating time of the drive mechanism are also achieved.

The spring properties of a leaf spring element can be designed differently, depending on the output required for the drive unit. Advisably, a leaf spring element is constructed as a leaf spring package consisting of several individual springs or spring packages, which are parallel to one another, the radially aligned central transverse axis intersecting the leaf spring package essentially centrally with respect to its width. Moreover, the leaf spring elements are preferably rotated about their central transverse axis and, with that, disposed so that they are inclined with respect to the axis of rotation. This means that the clamped leaf plane of the leaf spring elements is tilted or inclined with respect to the axis of rotation.

All leaf spring elements should have the same length and be disposed in the same plane. This means that their ends are all at the same height or in the same horizontal plane.

In order to construct the drive unit as compactly as possible, it is advisable to dispose the opposed-action part between the base part and the fastening part, both of which may be constructed plate-shaped. The concept of "plate-shaped" is to be understood so that the parts have a shape of large area, which need not, however, be closed. Rather, for example, the fastening part may also be constructed star-shaped or the like, in particular, in order to be able to mount parts of the drive device. For greater compactness, it is advisable if the opposed-action part and the fastening part are disposed either one inside the other or one engaging the other.

Advisably, the drive device is an electromagnetic drive device comprising several drive modules, of which, a first drive part is disposed at the opposed-action part and a second drive part, interacting with the first drive part, is disposed at the fastening part. Advisably, the first drive part is the electromagnet, which is disposed at the opposed-action part, and the second drive part is positioned in the form of the armature at the fastening part. The drive modules are disposed symmetrically to one another offset about the axis of rotation.

Moreover, the invention relates to a vibrating spiral conveyor comprising a drive unit of the type described.

Further advantages, distinguishing features and details of the invention arise out of the example, described in the following, as well as from the drawings.

DESCRIPTION OF THE PREFERRED EMBODIMENTS

Figure 1:
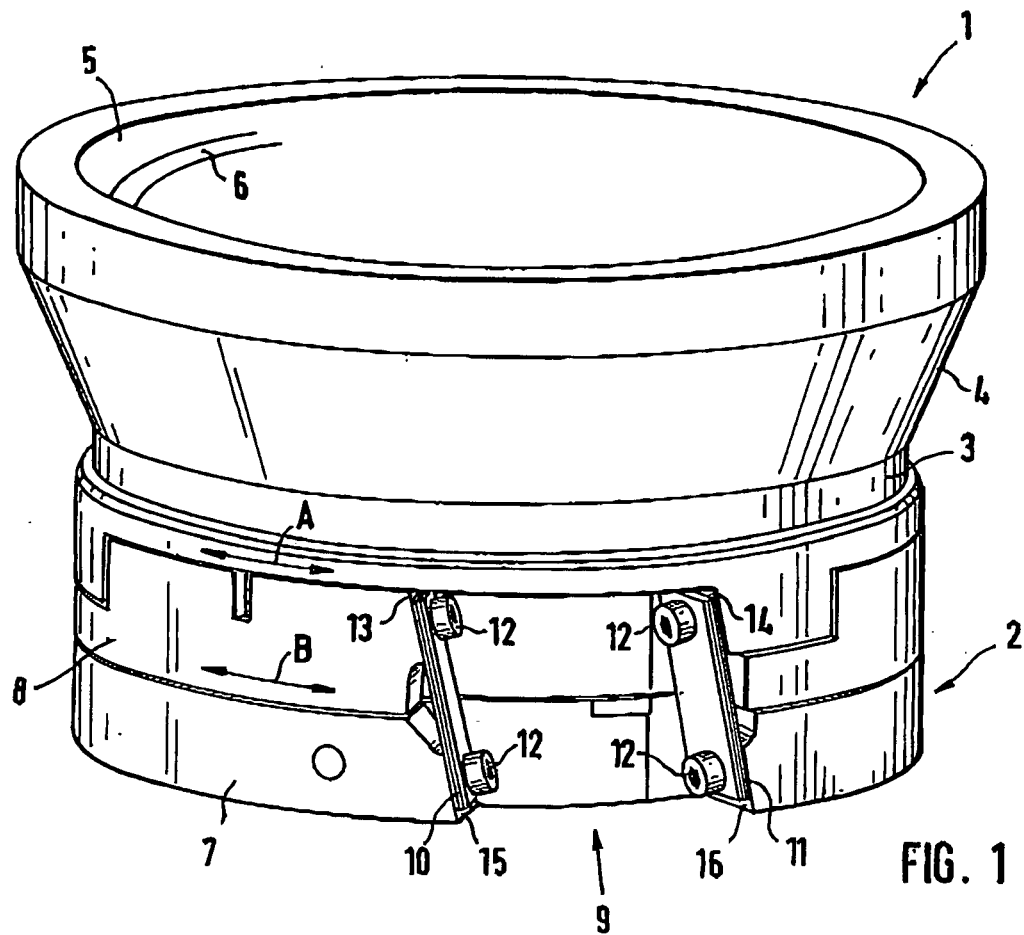
FIG. 1 shows a prospective representation of an inventive vibrating spiral conveyor comprising an inventive drive unit.

FIG. 1 shows an inventive vibrating spiral conveyor 1, comprising an inventive drive unit 2 with a fastening part 3, to which a pot 4, at the inside 5 of which a peripheral spiral conveyor 6 is formed, is fastened. In use, small components are brought into the port 4 and moved by the vibrating operation along the conveying spiral 6, moving in screw fashion from the bottom to the top to a delivery position. At the transfer station, they are delivered, for example, to a production or installation robot. Preferably, the pot 4 is detachable and can be exchanged for a different pot.

Figure 2:
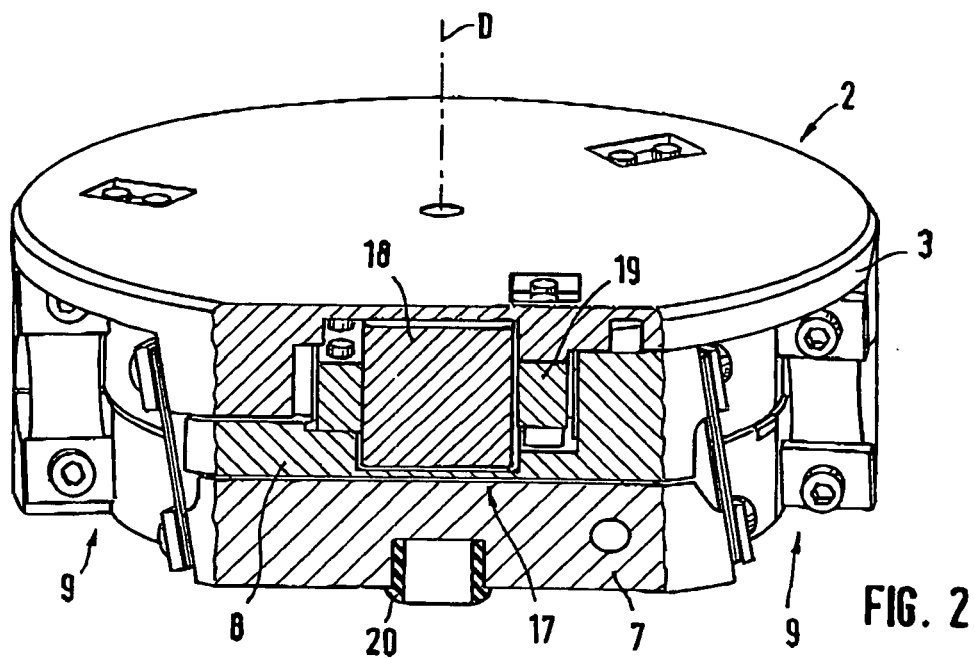
FIG. 2 shows a prospective representation of the drive unit of FIG. 1, partially in section.

FIG. 2 shows the inventive drive unit 2 in detail. In addition to the fastening part 3, which is plate-shaped here and closed at the upper side, the drive unit 2 has a base part 7, as well as an opposed-action part 8. The base part 7 as well as the opposed-action part 8 is constructed ring-shaped here, as can be seen, in particular, in FIG. 3. Over the base part 7, the drive unit 2 and, with it, the whole of the vibrating spiral conveyor 1 can be connected, for example, over rubber pads 20 with the machine frame of a manufacturing or assembly unit. Towards the top, the structure with the lower base part 7, the central opposed-action-part 8 and the upper fastening part 3 is closed off, as described over the latter. The three components are offset axially somewhat to one another in the direction of the axis of rotation D or are disposed at a distance from one another, so that, while in operation, relative movements of the opposed-action part 8 and the fastening part 3 with respect to one another and with respect to the stationary base part are possible. Both carry out an oscillating, torsionally vibrating movement about the axis of rotation D, as indicated by the two double arrows A and B. Because the top 4 is connected with the fastening part 3, the pot 4 also carries at the corresponding movement.

In the example shown, at least three recesses 9, which are offset symmetrically by 120° about the axis of rotation D, are formed at the base part 7, at the opposed-action part 8 as well as at the fastening part 3 by appropriate developments at the edge. Leaf spring elements 10, 11, over which the opposed-action part 8 as well as the installation part 3 are connected elastically with the base part 7, are taken up in these recesses. In the example shown, the opposed-action part 8 is connected over first leaf spring elements 10, which total three in the example shown and are formed in each case as a leaf spring package of several individual springs, with the base part 7. Correspondingly, the fastening part 3 is connected over the three second leaf spring elements 11, which are all so constructed as leaf spring packages and preferably are identical with the leaf spring elements 10, with the base part 7. The respective leaf spring elements 10, 11 are also disposed offset to one another symmetrically about the axis of rotation D. The respective ends of the leaf spring elements 10, 11 are bolted to the corresponding part over suitable fastening means 12. It is evident that the fastening part 3 and the opposed-action part 8 lie one inside the other or engage one another so that, in the region of the recess 9, appropriate fastening sections for the respective upper end of a leaf spring element 10, 11 are formed at the opposed-action part 8 or at the fastening part 3. In the example shown, the fastening surface at the opposed-action part is labeled 13 and that at the fastening part is labeled 14. Corresponding fastening surfaces 15, 16 are provided at the base part 7.

Figure 3:
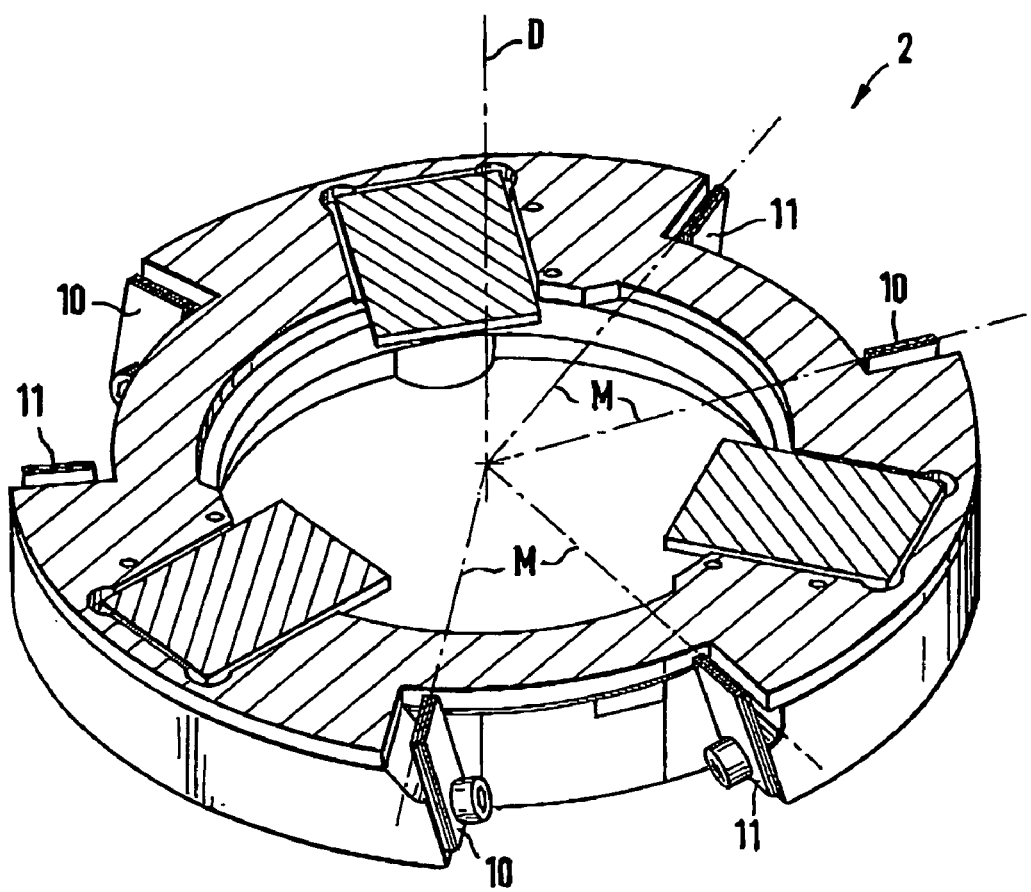
FIG. 3 shows the drive part of FIG. 2 in a sectional representation through the opposed-action part, and FIG. 4 a diagrammatic representation of a view of the drive unit to show the alignment of the leaf spring elements.
Figure 4:
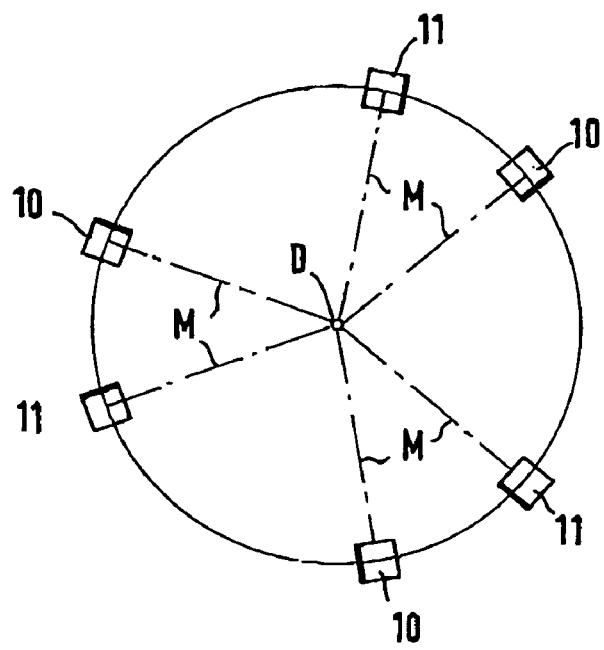

As shown in FIGS. 1 and 2, the leaf spring elements 10, 11 are disposed at a slight angle with respect to the vertical and, with that, to the axis of rotation D. This means that they are not vertical and, instead, are at a slight angle of inclination. The alignment of the individual leaf spring elements with respect to the axis of ration D arises, moreover, from FIG. 3, in which a sectional view of the drive unit 2 is shown. The section passes through the opposed-action part in the horizontal plane, which intersects the leaf spring elements in the center with respect to their length. The leaf spring elements 10, 11 are all disposed at the same height that is, their upper and lower ends lie in the respectively same horizontal plane. Because of the alignment of the respective fastening surfaces 13, 15 and 14, 16 respectively, the leaf spring elements 10, 11 are aligned in such a manner with respect to the axis of rotation D, that their central transverse axis M extends, as shown in FIG. 3, radially with respect to the axis of rotation D, intersecting the latter. With respect to the length of the leaf spring elements 10, 11, the central transverse axis M extends in the middle of the spring element. Correspondingly, with respect to the width of the leaf spring elements 10, 11, which consist of several individual springs, it also extends centrally. This means that, in the length direction as well as in the width direction, it passes through the center of the spring element and is parallel to the respective side surfaces of a leaf spring element. Because the leaf spring elements are disposed at the same height, all central transverse axes M of the individual leaf spring elements 10, 11 also lie in the same horizontal plane through, which the section of FIG. 3 is placed.

Because of the torsionally vibrating movement of the opposed-action part 8 and the fastening part 3 about the axis of rotation D, brought about by the drive device that is still to be described, the leaf spring elements 10, 11 experience a bending stress as well as a torsional stress because of the rotational movement, since the ends of the leaf spring elements 10, 11 are fixed and do not move with respect to the base part 7, while their upper ends are moved. Because of the alignment of the leaf spring elements 10, 11 with their central transverse axes M extending radially to the axis of rotation D, intersecting the latter, these bending and torsional stresses or the forces acting are, however, very slight. For this reason, damage to the spring elements is excluded even in continuous operation.

To produce the oscillating, torsional vibrating movement, a drive device is provided, which comprises three drive modules 17, which are disposed also distributed at equal angular distances about the axis of rotation D, a drive module in each case being disposed in the center between two recesses 9. Each drive module 17, which acts between the opposed-action part 8 and the fastening part 3, comprises a coil or an electromagnet 18, which, in the example shown, is connected with the opposed-action part 8 and oscillates with the latter. Moreover, each drive module 17 comprises a magnet armature 19, which, in the example shown, is connected with the fastening part 3 and oscillates with the latter. The electromagnet 18, as well as the magnet armature 19, is accommodated in corresponding accommodating sections at the respective part. The drive device is operated preferably by the usual mains voltage, that is, by the usual AC voltage. However, pulse voltage operation is also possible. If now the drive device is actuated, the opposed-action part 8 and the fastening part 3 are moved in oscillating fashion opposite to one another because of the electromagnetic forces acting and carry out a torsional vibrating movement about the axis of rotation D. With respect to the stationary base part 7, the movement is coupled over the leaf spring elements 10, 11. During the oppositely oscillating movement, the leaf spring elements 10, 11 are bent about their lower and upper fastening point and twisted minimally. In addition to the resulting, oppositely vibrating movement of the fastening part 3 with the pot 4 and the opposed-action part 8 about the axis of rotation D, there is also, as a result of the inclined position of the leaf spring elements 10, 11 with respect to the horizontal plane, an opposite, periodic lifting and lowering of the fastening part 3 and of the opposed-action part 8 in the vertical relative to the base part 7, however with only a small aptitude.

All leaf spring elements 10, 11 are identical. In other words, the same number of individual springs having the same spring properties is used in each case. Consequently, the respective spring constant of the individual leaf spring elements 10, 11 for the masses connected with them (in the case of the leaf spring elements 10, the counter mass, formed essentially from the opposed-action part 8 and the electromagnet 18 aside from the fastening elements and, in the case of the effective mass, essentially the fastening part 3, the magnet armature 19 and the pot 4 aside from the fastening elements) is the same. Accordingly, for both masses the same inherent or resonance frequency can be attained and, moreover, with respect to the oscillating torsionally vibrating movement about the axis of rotation D as well as the oscillating lifting movement in the direction of the vertical axis, that is, the axis of rotation D. In this connection, the effective mass and the counter mass are constructed so that, in addition, the inherent or resonance frequency for the oscillating torsionally vibrating movement about the axis of rotation D and the inherent or resonance frequency for the vertical lifting movement are approximately the same. Preferably, the drive device is operated with a frequency, which corresponds approximately to the inherent or resonance frequency, a subcritical operation with an operating frequency below the inherent frequency being aimed for.

As described, the stress on the leaf spring elements can be minimized by the inventive arrangement of the leaf spring elements 10, 11 with respect to the axis of rotation D. This means that, in comparison to the previous arrangement, the bending stress is clearly reduced and the torsion is insignificant. This results in defined vibrating relationships, which vary negligibly even over different drive units and, with that, over assembled vibrating spiral conveyors. Impairment of the spring properties or overloading and breakages are avoided. Moreover, the use of identically constructed individual springs is made possible, as well as of identically constructed leaf spring elements themselves, which simplifies the manufacture and warehousing and also the availability of spare parts.

The inventive construction of the drive unit makes it possible to design quasi standardized drive units of different output and four different areas of use, so that a selection system with several different drive parts is available to the user. Especially the detachability and exchangeability of the pot make it possible, taking into consideration the given requirements with regard to the effective mass, to exchange pots, which are assigned to a particular drive unit, the pots having been designed to correspond to particular requirements.

The invention claimed is:

1. Drive unit for a vibrating spiral conveyor having a central axis of rotation comprising a base part, a pot, an opposed-action part and a fastening part, said opposed-action part being flexibly connected by first leaf spring elements with the pot, said fastening part being flexibly connected by second leaf spring elements with the pot, said first and second leaf spring elements each having a central transverse axis and each having a longitudinal axis, the opposed-action part and the fastening part being enabled to be brought into an opposite, oscillating, torsionally vibrating movement about the central axis of rotation, the first and second leaf spring elements being disposed in such a manner that their central transverse axis (M), which is disposed essentially radially to the central axis of rotation and which is perpendicular to the longitudinal axis, intersects the leaf spring elements essentially in the center with respect to their respective length and extends parallel to lateral surfaces of the respective spring elements.

2. The drive unit of claim 1 wherein the fist and second leaf spring elements are each constructed as a leaf spring package comprising several mutually parallel individual springs or spring packages, the radially aligned central transverse axis of which interest the leaf spring package essentially centrally with respect to its width.

3. The drive unit of claim 1, wherein the first and second leaf spring elements are rotated about their respective central transverse axes (M) and are disposed inclined relative to the axis of rotation (D).

4. The drive unit claim 1, wherein all of the first and second leaf spring elements have the same length and are disposed in the same plane.

5. The drive unit of claim 1, wherein the opposed-action part is disposed between the base part and the fastening part.

6. The drive unit of claim 1, wherein the opposed-action part and the fastening part are constructed plate-shaped.

7. The drive unit of claim 1, wherein the opposed-action part and the fastening part lie one inside the other.

8. The drive unit of claim 1, wherein the drive device is an electromagnetic drive device comprising several drive modules, of which a first drive part is disposed at the opposed-action part and a second drive part, interacting with the opposed-action part, is disposed at the fastening part.

9. Vibrating spiral conveyor, comprising the drive unit of claim 1.

10. The drive unit of claim 1, wherein the opposed-action part and the fastening part are ring-shaped.

11. The drive unit of claim 1, wherein the opposed-action part and the fastening part are star-shaped.

12. The drive unit of claim 1, wherein the opposed-action part and the fastening part are disposed so as to engage one another.

* * * * *